United States Patent
Zimmer et al.

(10) Patent No.: US 7,364,087 B2
(45) Date of Patent: Apr. 29, 2008

(54) VIRTUAL FIRMWARE SMART CARD

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 513 days.

(21) Appl. No.: 10/877,614

(22) Filed: Jun. 24, 2004

(65) Prior Publication Data

US 2005/0289646 A1    Dec. 29, 2005

(51) Int. Cl.
*G06K 19/00* (2006.01)

(52) U.S. Cl. ............................. 235/492; 726/9; 703/23; 703/24

(58) Field of Classification Search ................ 235/492; 726/9; 710/2; 713/182; 703/23, 24
See application file for complete search history.

(56) References Cited

U.S. PATENT DOCUMENTS

| | | | |
|---|---|---|---|
| 6,516,357 B1 * | 2/2003 | Hamann et al. ................ 710/2 |
| 6,729,549 B2 * | 5/2004 | Hamann et al. ............ 235/492 |
| 6,769,622 B1 * | 8/2004 | Tournemille et al. ....... 235/492 |
| 7,044,390 B2 * | 5/2006 | Leaming ..................... 235/492 |
| 7,085,931 B1 * | 8/2006 | Smith et al. ................ 713/182 |

FOREIGN PATENT DOCUMENTS

EP    0 936 530 A1 *   2/1998

OTHER PUBLICATIONS

Internet article "Extensible Firmware Interface" available at http://www.intel.com/technology/efi/.*

* cited by examiner

*Primary Examiner*—Daniel Hess
(74) *Attorney, Agent, or Firm*—Blakely, Sokoloff, Taylor & Zafman LLP

(57)    ABSTRACT

A method of copying virtual firmware smart card code from a first secured memory in a system and loading the virtual firmware smart card code into a second secured memory in the system so that the code may be run on a microprocessor to provide smart card services to the system.

26 Claims, 4 Drawing Sheets

AGP: Advanced Graphics Port
MCH: Memory Controller Hub a.k.a. Northbridge
ICH: I/O Controller Hub a.k.a. Southbridge
LPC: Low-pin Count Bus
FWH: Firmware Hub
USB: Universal Serial Bus
PCI: Peripheral Component Interconnect Bus

VIRTUAL FIRMWARE SMART CARD

BACKGROUND OF THE INVENTION

A smart card is typically a plastic card embedded with a computer chip that stores and transacts data between users. This data may be associated with secret information and is stored and processed within the card's chip, generally a low performance 8-bit microprocessor with a small amount of memory. The card data is transacted via a reader that may be part of a computing system. Smart card systems are in use today in many industries, including healthcare, banking, entertainment and transportation.

On a computer platform today, no capabilities exist for secure, isolated storage and execution, such as that provided by a smart card, in both the pre-boot and the runtime environments.

BRIEF DESCRIPTION OF THE DRAWINGS

A better understanding of the present invention can be obtained from the following detailed description in conjunction with the following drawings, in which.

DETAILED DESCRIPTION OF THE PRESENT INVENTION

Embodiments of a method to provide virtual firmware smart card functionality for a computer system are disclosed. The computer system may be any system which includes at least a processor (CPU) and memory, including, but not limited to, a personal computer (PC), a mobile computer, a server, or a handheld device. These systems may include various types of software, firmware, and hardware.

Reference throughout this specification to "one embodiment" or "an embodiment" indicate that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Tamper-proof system techniques may be used to provide the same integrity and functionality as provided in hardware smart cards by storing smart card code in a secure memory location on a system. The secure stored smart card code shall be referred to as a virtual firmware smart card (VFSC), or may alternately be referred to as virtual firmware smart card code.

Figure 1:
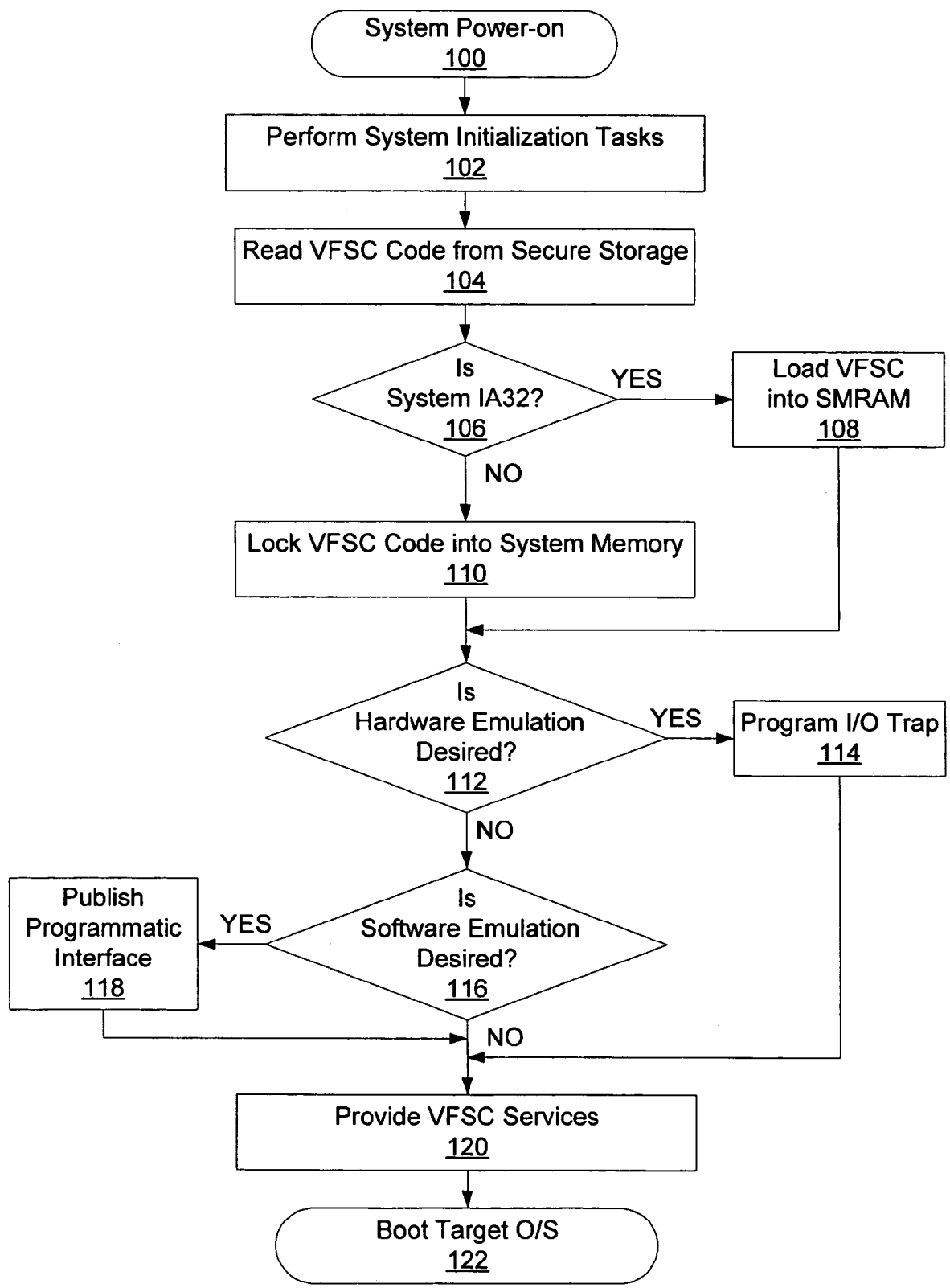
FIG. 1 is an illustration of a flowchart according to one embodiment of the present invention.

FIG. 1 is a flowchart which illustrates one embodiment of the present invention. After a system is powered on (block 100), system initialization tasks may be performed (block 102). System initialization tasks may include identifying and testing memory devices, identifying hardware, loading drivers, or other tasks that must be completed prior to booting a target. Next, the virtual firmware smart card is read from secure storage (block 104). The secure storage may comprise, by way of example and not limitation, a secure flash memory location. After the VFSC has been read, if the system is an IA-32 architecture based system (block 106), the VFSC will be loaded into SMRAM (block 108). SMRAM, or System Management Random Access Memory, is a dedicated system management memory space. If the system is not an IA-32 architecture based system, the VFSC may be locked into system memory using a chipset or CPU technique (block 110). In one embodiment, the SMRAM locking mechanism in the Memory Controller Hub (MCH) may be used to lock the VFSC into system memory. In another embodiment, a SMI Transfer Monitor (STM) with page-level protection of SMRAM may be used to lock the VFSC into system memory.

Next, it is determined whether hardware emulation is desired (block 112). If hardware emulation is desired, then an I/O trap is programmed (block 114). In one embodiment, for hardware emulation, an O/S driver may send specific smart card commands to an I/O port. The I/O Controller Hub (ICH) is programmed to trap on access to specific addresses. When these addresses are accessed, an interrupt is generated, which causes firmware in SMM to execute. The firmware stored in SMRAM (the VFSC) emulates the smart-card command, returning the result to the I/O port address of the ICH for the host software to read.

If software emulation is desired (block 116), a programmatic interface may be published (block 118). In one embodiment using software emulation, the host O/S driver will look for an EFI interface. EFI is a public industry specification that describes an abstract programmatic interface between platform firmware and shrink-wrap operating systems or other custom application environments. The EFI framework standard includes provisions for extending basic input output system ("BIOS") code functionality beyond that provided by the BIOS code stored in a platform's boot firmware device. The EFI interface is named via a GUID, or globally unique identifier. The host O/S driver will then invoke the software interface.

After the VFSC has been loaded into either SMRAM or system memory and the desired type of emulation has been chosen, VFSC services may be provided to the system (block 120). VFSC services may be provided to the system in the pre-boot environment. Examples of VFSC services which may be provided to the system include key exchange, authentication, signing, and other services that could typically be provided by a hardware smart card. Finally, as shown in block 122, the target O/S is booted. VFSC services may be provided to the system in the runtime environment after the O/S has booted as well.

In embodiments of the present invention the VFCS may provide emulation for an ISO7816 Smart Card Interface, hardware emulation of a TCPA Platform Module (TPM), Security System Processor (SSP), IBM 4758 PCI-attached cryptographic coprocessor module, or a software interface into a TPM ore other aforementioned hardware entity. Access mechanisms may include Legacy BIOS, or EFI protocol.

Figure 2:
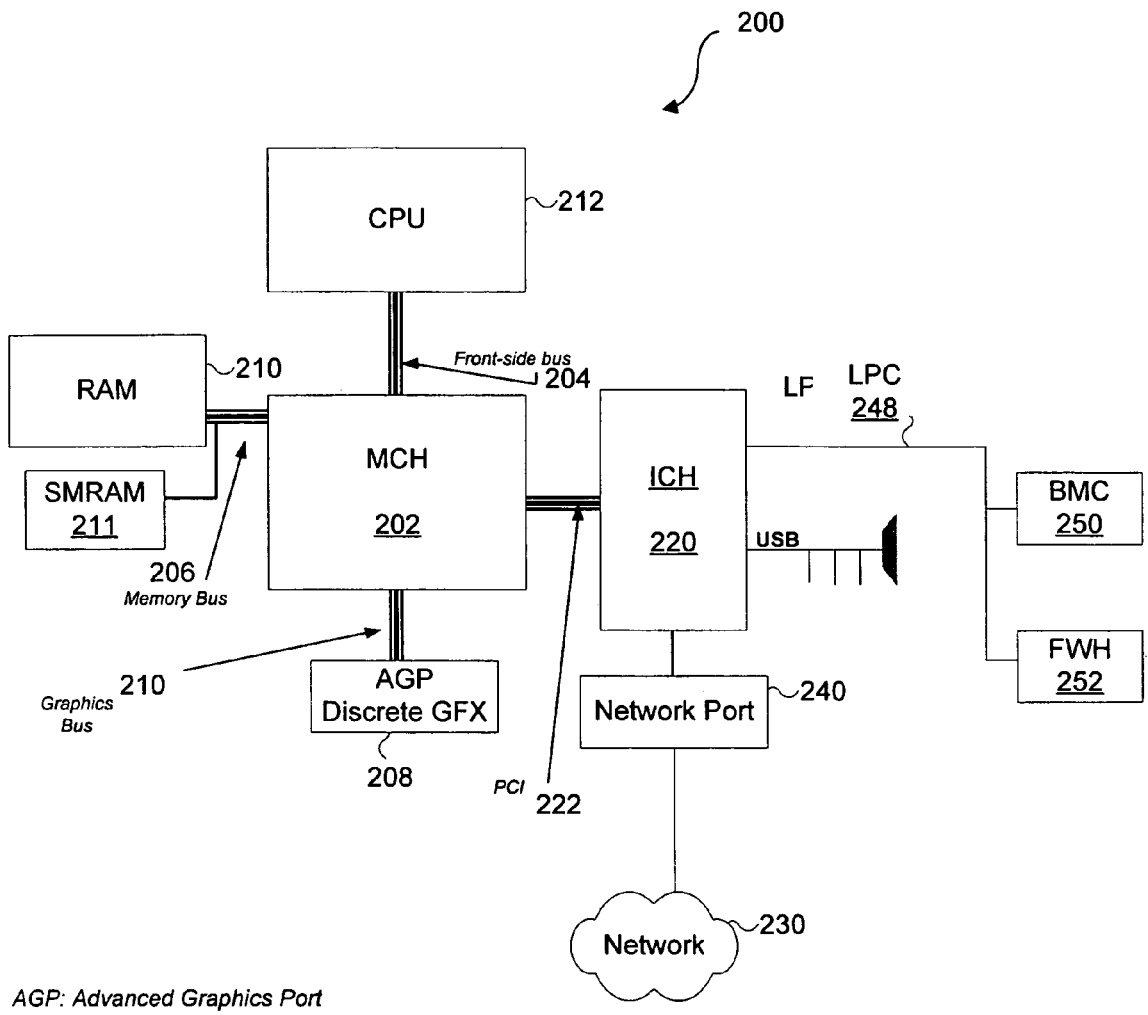
FIG. 2 is an illustration of a system including a virtual firmware smart card according to one embodiment of the present invention.

FIG. 2 illustrates a block diagram 200 of an exemplary computing system which implements a virtual firmware smart card. Processor 212 communicates with a memory controller hub (MCH) 202, also known as a Northbridge, via the front side bus 204. The MCH 202 communicates with system memory 210 via a memory bus 206. The MCH 202 may also communicate via a graphics bus 210 with an advanced graphics port (AGP) 208 to interface with an external video display unit. The MCH 202 communicates with an I/O controller hub (ICH) 220, also known as Southbridge, via a peripheral component interconnect (PCI) bus 222. A baseboard management controller (BMC) 250 may be connected to the processor via a low pin count (LPC) bus 248. The firmware hub 252 is typically connected to the processor via the LPC bus, as well. The processor may be operatively connected to a network 230 via a network port 240 through the ICH 220.

Initially, the VFSC is stored in secure flash memory, 252. Upon system initialization, the VFSC is either loaded into SMRAM, 211, for an IA-32 architecture based system, or it is locked into system memory 210. The VFSC is then accessible either through an I/O trap which is programmed on the ICH for hardware emulation, or it may be accessed via a programmatic interface for software emulation.

The host CPU, processor 212, is used for all VFSC computation, such as cryptography. The use of a host processor for VFSC computation provides a great increase in performance as compared to a typical hardware smart card.

In one embodiment, the VFSC may be retrofitted on a computer system that presently has no smart card functionality. A firmware update may add the desired VFSC functionality.

In another embodiment, the system implementing the VFSC may be a cellular telephone or handheld communications device. For a cellular telephone, the VFSC may be implemented instead of a SIM (subscriber identity module) card. This implementation would be cost saving and would also allow for higher levels of integration.

Figure 3:
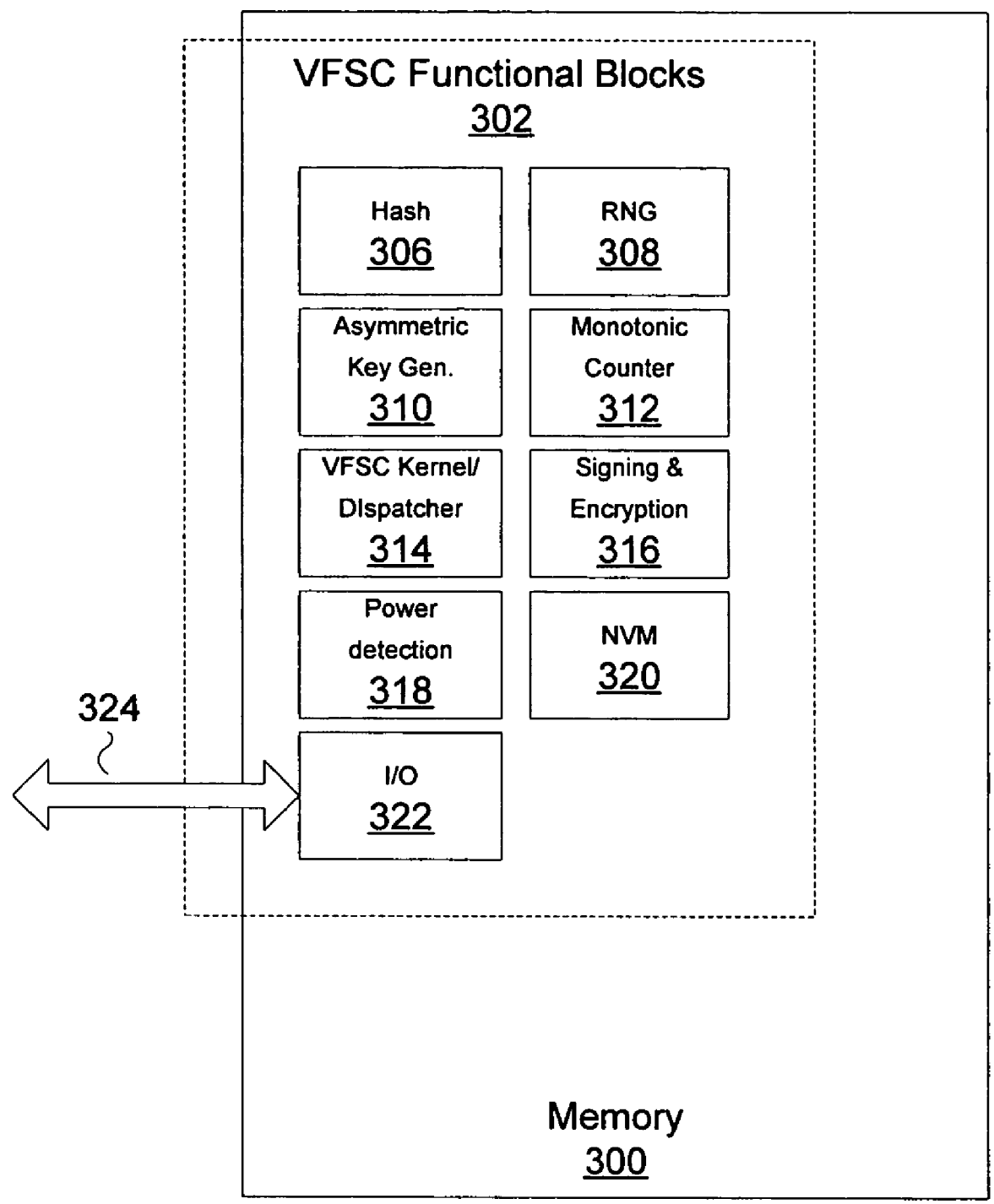
FIG. 3 is an illustration of an implementation of a virtual firmware smart card according to one embodiment of the present invention.

FIG. 3 illustrates a block diagram of the firmware implementation for the VFSC. VFSC functional blocks 302 are stored within memory 300. Memory 300 may be SMRAM, or may be another tamper-proof memory encapsulation, such as protected system memory.

The VFSC functional blocks may include functions that would typically be found on a hardware smart card. These functional blocks may include a hash (306), a random number generator, or RNG (308), an asymmetric key generator (310), a monotonic counter (312), a VFSC kernel/dispatcher (314), signing and encryption (316), power detection (318), non-volatile memory (320), and I/O (322). VFSC functions are provided to the system via I/O interface 324. As described above, the I/O interface 324 may be implemented as an I/O trap for hardware emulation, or may be a programmatic or protocol interface for software emulation.

New cryptographic support modules or other functional blocks or smart card upgrades may be added to the VFSC through a firmware update.

Figure 4:
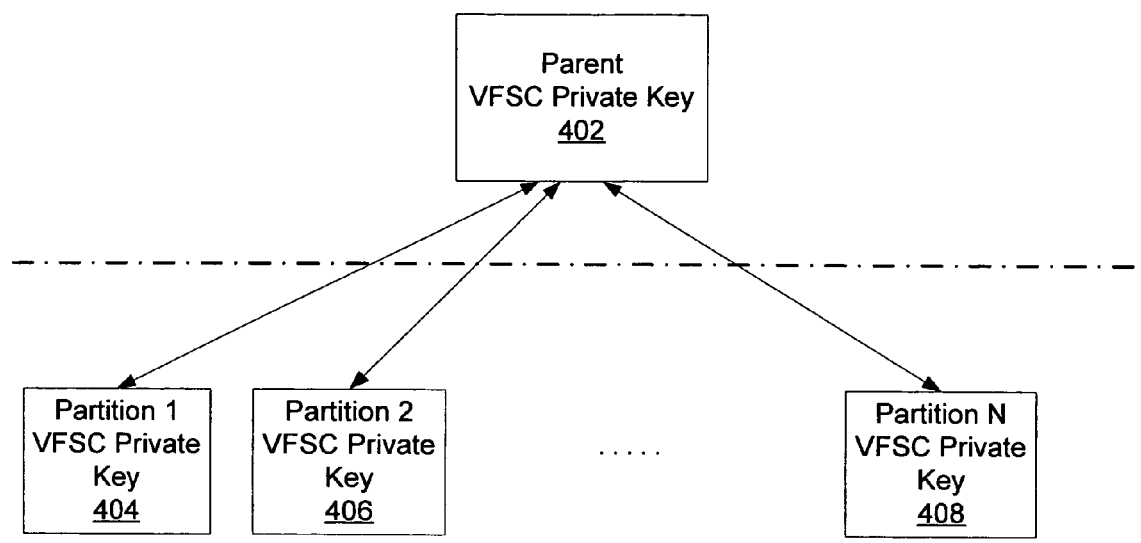
FIG. 4 is an illustration of a partitioned system using a virtual firmware smart card according to one embodiment of the present invention.

FIG. 4 is an illustration of an embodiment of the present invention wherein the VFSC is implemented in a NUMA (non-uniform memory access system). In a partitioned system, each partition has a single set of VFSC firmware interfaces and hardware or software emulation per partition. The parent (402) can authenticate each of the partitions (404, 406) using secure VFSC-VFSC authentication. The VFSC may use the out-of-band bus between base-board management controllers (BMCs) and IPMI (Internet Protocol Management Interface) protocol to securely synchronize keys or perform other smart card functions. This may provide the ability to have a fault-tolerant, virtual trusted platform module (TPM) for high availability systems. The private key is not lost if only one node fails, thus reliability without denial of service may be accomplished. In this embodiment, there will always be at least one instance of the VFSC as long as there is at least one host processor running.

Thus, a method and apparatus for a virtual firmware smart card (VFSC) has been disclosed. These methods may be implemented in software or firmware, among other implementations. Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

In the above description, numerous specific details are set forth. However, it is understood that embodiments may be practiced without these specific details. In other instances, well-known circuits, structures and techniques have not been shown in detail in order not to obscure the understanding of this description. Embodiments have been described with reference to specific exemplary embodiments thereof. It will, however, be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

We claim:

1. A method comprising:
    copying virtual firmware smart card code from a first secured memory in a system;
    loading the virtual firmware smart card code into a second secured memory in the system;
    running the virtual firmware smart card code on a microprocessor to provide smart card services to the system; and
    programming a chipset in the system to provide input/output (I/O) traps for hardware emulation prior to running the virtual firmware smart card code on the microprocessor.

2. The method of claim 1, wherein the first secured memory comprises secured flash memory.

3. The method of claim 1, wherein the I/O traps comprise an ISO 7816 interface.

4. The method of claim 1, wherein the I/O traps comprise a trusted platform module (TPM) interface.

5. The method of claim 1, further comprising publishing a programmatic interface for software emulation prior to running the virtual firmware smart card code on the microprocessor.

6. The method of claim 5, wherein the programmatic interface comprises an EFI callable interface.

7. The method of claim 1, wherein loading the virtual firmware smart card code into a second secured memory comprises loading the virtual firmware smart card code into SMRAM.

8. The method of claim 1, wherein loading the virtual firmware smart card into a second secured memory comprises locking the virtual firmware smart card code into system memory.

9. The method of claim 1, wherein running the virtual firmware smart card code on a microprocessor to provide smart card services to the system comprises providing at least services for key exchange, authentication, and signing.

10. The method of claim 1, further comprising loading an operating system (O/S) subsequent to loading the virtual firmware smart card code into a second secured memory in the system.

11. The method of claim 1, further comprising updating the virtual firmware smartcard code by updating the system firmware.

12. An article comprising a machine-accessible medium having stored thereon instructions that, when executed by a machine, cause the machine to provide smartcard services to a system by:
copying virtual firmware smart card code from a first secured memory in a system;
loading the virtual firmware smart card code into a second secured memory in the system;
running the virtual firmware smart card code on a microprocessor to provide smart card services to the system; and
programming a chipset in the system to provide input/output (I/O) traps for hardware emulation prior to running the virtual firmware smart card code on the microprocessor.

13. The article of claim 12, wherein the first secured memory comprises secured flash memory.

14. The article of claim 12, wherein the instructions that, when executed by a machine, further cause the machine to provide smartcard services to the system by publishing a programmatic interface for software emulation prior to running the virtual firmware smart card code on the microprocessor.

15. The article of claim 12, wherein loading the virtual firmware smart card code into a second secured memory comprises loading the virtual firmware smart card code into SMRAM.

16. The article of claim 12, wherein loading the virtual firmware smart card into a second secured memory comprises locking the virtual firmware smart card code into system memory.

17. The article of claim 12, wherein running the virtual firmware smart card code on a microprocessor to provide smart card services to the system comprises providing at least services for key exchange, authentication, and signing.

18. The article of claim 12, wherein the instructions that, when executed by a machine, further cause the machine to provide smartcard services to the system by loading an operating system (O/S) subsequent to loading the virtual firmware smart card code into a second secured memory in the system.

19. A system, comprising:
a processor;
a network interface device coupled to the processor; and
memory coupled to the processor, the memory adapted for storing instructions, which upon execution by the processor, cause virtual firmware smart card code to be copied from a first secured memory in a system, virtual firmware smart card code to be loaded into a second secured memory in the system, virtual firmware smart card code on a microprocessor to be run to provide smart card services to the system, and program a chipset in the system to provide input/output (I/O) traps for hardware emulation prior to running the virtual firmware smart card code on the microprocessor.

20. The system of claim 19, wherein the first secured memory comprises secured flash memory.

21. The system of claim 19, wherein the I/O traps comprise an ISO 7816 interface.

22. The system of claim 19, wherein the I/O traps comprise a trusted platform module (TPM) interface.

23. The system of claim 19, further comprising instructions to cause the machine to publish a programmatic interface for software emulation prior to running the virtual firmware smart card code on the microprocessor.

24. The system of claim 23, wherein the programmatic interface comprises an EFI callable interface.

25. The system of claim 19, wherein causing virtual firmware smart card code on a microprocessor to be run to provide smart card services to the system comprises providing at least services for key exchange, authentication, and signing.

26. The system of claim 19, further comprising instructions to cause the machine to load an operating system (O/S) subsequent to loading the virtual firmware smart card code into a second secured memory in the system.

* * * * *